J. B. HORSLEY.
COFFEE POT.
APPLICATION FILED JAN. 15, 1915.
1,217,179.
Patented Feb. 27, 1917.
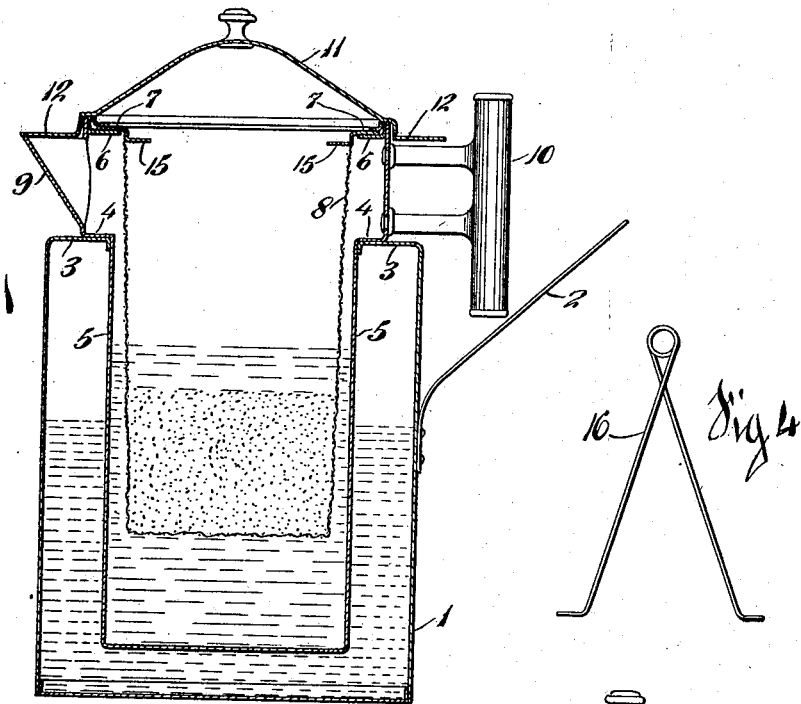

UNITED STATES PATENT OFFICE.

JOSEPH B. HORSLEY, OF CINCINNATI, OHIO.

COFFEE-POT.

1,217,179.  Specification of Letters Patent.  Patented Feb. 27, 1917.

Application filed January 15, 1915. Serial No. 2,473.

*To all whom it may concern:*

Be it known that I, JOSEPH B. HORSLEY, a citizen of the United States, and a resident of Cincinnati, in the county of Hamilton and State of Ohio, have invented a new and useful Improvement in Coffee-Pots, of which the following is a full, clear, and exact description, reference being had to the accompanying drawings, forming a part of this specification.

My invention relates to coffee pots of the kind designed for the preparation and serving of coffee.

The object of my invention is to provide a coffee pot for the preparation of coffee in the use of which the strength and aroma of the bean are fully preserved in the liquid product, and the making of the latter is, moreover, greatly expedited.

An additional object of my invention is to provide a coffee pot for the preparation and serving of coffee, wherein the vessel designed for use at the table is not soiled by coming into contact with stove or flames during the preparation of the beverage, and which will not, therefore, damage or soil the table linen when set upon the table for service.

Further objects of my invention will appear from the following detailed description thereof.

In the several figures of the drawings like numerals indicate like parts.

In the drawings:

Figure 1 is a central vertical section of my new coffee pot;

Fig. 2 is a top view thereof;

Fig. 3 is a side elevation of the upper portion of said coffee pot;

Fig. 4 is a detail of the lifter to be used in connection with my new coffee pot for removing the inner, percolating vessel after the coffee has been prepared.

The numeral 1 indicates a vessel of any suitable shape and material, preferably of aluminum or enamel ware. The said vessel is designed to be used upon a stove for the purpose of heating and boiling water. A handle 2 is provided on said vessel. The upper edge, or rim, of said vessel is formed into an inturned flange, or shoulder 3, which is adapted to serve as a rest for the shoulder 4 of a vessel 5, the lower part of the vessel 5 being arranged to extend downwardly into the vessel 1 and into the water contained in said vessel 1, as clearly shown in Fig. 1 of the drawings. Extending entirely around the vessel 5, near the upper edge, or rim, thereof, is a flange 6, which is arranged to serve as a rest for the outturned flange 7 of the percolating vessel 8. The vessel 5 is of solid metal construction and is adapted to contain the liquid of which the coffee is made and, after the making, the finished beverage. The vessel 8 is of any suitable woven, or mesh, material, or other suitable material, and is adapted to contain the ground coffee and to permit the percolation of the liquid in vessel 5 through said grounds during the preparation of the beverage. The vessel 5 is provided with a spout 9 and a handle 10, and a lid 11 is provided as a covering therefor.

On the lid 11, at opposite sides thereof, are lips 12, either of which is adapted to serve as a covering for the spout 9 of the vessel 5. On the outside of the vessel 5, at opposite sides thereof, are lugs 13, arranged to serve as catches for the lips 12 to hold the lid 11 on the vessel, 5, when the spout 9 is uncovered for use, as clearly shown in Fig. 2 of the drawings. To provide for this purpose the lugs 13 are preferably placed on a diameter at right angles to that of the spout 9 and handle 10, and the free, or engaging end, 14, of each lug is turned toward the handle 10, so that when the vessel 5 is tilted to pour the coffee, the lid will not be permitted to fall from the vessel.

On the inside of the vessel 8, at opposite sides and near the top thereof, are lugs 15, suitable to be used in lifting the vessel 8 from the vessel 5, by means of the utensil 16 illustrated in Fig. 4 of the drawings, after the beverage has been prepared.

From the foregoing description the nature and use of my new coffee pot will be apparent to those skilled in the art. When it is desired to prepare coffee for use, the vessel 1 is filled to a suitable depth with water and placed upon the stove. When this has been done, the ground coffee is placed in the vessel 8 and water in vessel 5, and the parts assembled as clearly shown in the drawings. The heat necessary for the preparation of the beverage is thus applied through the agency of the water in the outer vessel 1, and the vessel 5 containing the desired product is consequently prevented from coming into contact with either stove or flame and the same is thus unsoiled when removed from the vessel 1 for use as a part of the table service. In this method of applying the heat, moreover, I find that the strength and aroma of the coffee is effectually preserved and a superior beverage prepared with great facility and expedition. Before pouring the coffee from the vessel 5, the inner ground-containing vessel 8 is, of course removed, and thus only the liquid beverage is brought to the table for use.

It will be understood that many obvious modifications of the details as above described may be made, and that such are within the purview of my invention and the scope of the appended claim. It is obvious, furthermore, that other beverages, as for instance, tea, may be prepared equally well by the use of the invention as described, and that the principle of the device as thus employed is unchanged, and I therefore consider the same as within the scope of my said invention.

Having thus described my invention, what I claim as new and desire to secure by Letters Patent, is:

In combination with an outer vessel for boiling water, a second vessel arranged to rest in said outer vessel and to extend into the water therein, said second vessel being adapted to contain a liquid of which a beverage is to be made, a spout on said second vessel, a percolating vessel arranged to rest in said second vessel and to extend into the liquid therein, a lid to cover said second vessel and said percolating vessel, a lip on said lid adapted to cover said spout, and means on said second vessel adapted to engage said lip when the same is removed from said spout to prevent said lid from falling from said vessel during the tilting thereof.

JOSEPH B. HORSLEY.

Witnesses:
FRED'K J. WENDELN,
ARTHUR H. EWALD.

Copies of this patent may be obtained for five cents each, by addressing the "Commissioner of Patents, Washington, D. C."